US012271186B2

(12) United States Patent
Prashanth et al.

(10) Patent No.: US 12,271,186 B2
(45) Date of Patent: Apr. 8, 2025

(54) METHOD AND SYSTEM FOR MONITORING CONDITION OF A SAMPLE HANDLING SYSTEM OF A GAS ANALYSER

(71) Applicant: ABB Schweiz AG, Baden (CH)

(72) Inventors: Krishna Prashanth, Bengaluru (IN); Sabyasachi Bhattacharyya, Pune (IN); Kalyan Kumar Mallick, Bangalore (IN)

(73) Assignee: ABB Schweiz AG, Baden (CH)

(*) Notice: Subject to any disclaimer, the term of this patent is extended or adjusted under 35 U.S.C. 154(b) by 373 days.

(21) Appl. No.: 17/275,696

(22) PCT Filed: Sep. 12, 2019

(86) PCT No.: PCT/IB2019/057701
§ 371 (c)(1),
(2) Date: Mar. 12, 2021

(87) PCT Pub. No.: WO2020/053807
PCT Pub. Date: Mar. 19, 2020

(65) Prior Publication Data
US 2022/0026894 A1    Jan. 27, 2022

(30) Foreign Application Priority Data
Sep. 12, 2018   (IN) .............................. 201841034401

(51) Int. Cl.
*G05B 23/02*     (2006.01)
*G01N 35/00*     (2006.01)
(Continued)

(52) U.S. Cl.
CPC ...  *G05B 23/0283* (2013.01); *G01N 35/00584* (2013.01); *G01N 35/1095* (2013.01); *G01N 1/2247* (2013.01)

(58) Field of Classification Search
CPC ................ G05B 23/00; G05B 23/0205; G05B 23/0259; G05B 23/0283; G05B 23/0294;
(Continued)

(56) References Cited

U.S. PATENT DOCUMENTS 6,004,514 A  * 12/1999  Hikosaka ............... G01N 30/88
                                                          422/89
2008/0077260 A1 *  3/2008  Porter ................... F25B 49/005
                                                          62/129
(Continued)

FOREIGN PATENT DOCUMENTS

CN          106198886 A  * 12/2016
EP          2556879 A1    2/2013

OTHER PUBLICATIONS

European Patent Office, International Search Report for PCT/IB2019/057701, Jan. 30, 2020, 5 pages.
(Continued)

*Primary Examiner* — Son T Le
*Assistant Examiner* — Matthew W. Baca
(74) *Attorney, Agent, or Firm* — Leydig, Voit & Mayer, Ltd.

(57) ABSTRACT

The present invention discloses a method and a system for monitoring condition of a sample handling system connected to a gas analyzer. The sample handling system comprises a sample line for supplying a gas sample to the gas analyzer, and sample handling devices. The system for monitoring condition, receives measurements from temperature and pressure sensors connected to the sample line and obtains operating characteristics of the sample handling devices based on the measurements and model of the sample handling system; and determines the condition of the sample handling system based on comparison of the operating characteristics of the sample handling device against a
(Continued)

plurality of reference values associated with the sample handling device.

17 Claims, 5 Drawing Sheets

(51) Int. Cl.
  *G01N 35/10* (2006.01)
  *G01N 1/22* (2006.01)
(58) Field of Classification Search
  CPC .............. G05B 23/0235; G05B 23/024; G05B 23/0243; G05B 23/0254; G05B 23/0267; G05B 23/027; G05B 23/0275; G01N 35/00584; G01N 35/00594; G01N 35/00613; G01N 35/00623; G01N 2035/00643; G01N 35/10; G01N 35/1095; G01N 1/22; G01N 1/2247; G01N 2001/2267; G01N 2001/227; G01N 2001/2282
  See application file for complete search history.

(56) References Cited

U.S. PATENT DOCUMENTS

| 2008/0285192 | A1* | 11/2008 | Phadke ................... H02M 1/32 |
| | | | 361/87 |
| 2009/0287356 | A1* | 11/2009 | Dunne ............... G01N 15/1427 |
| | | | 700/282 |
| 2013/0018508 | A1 | 1/2013 | Reichel |
| 2013/0312487 | A1* | 11/2013 | Miyai ..................... F04B 49/00 |
| | | | 73/23.31 |
| 2019/0101475 | A1* | 4/2019 | Thompson ............. G01N 30/12 |
| 2020/0009619 | A1* | 1/2020 | Nonaka .................... B08B 3/14 |
| 2020/0056964 | A1* | 2/2020 | Mita ................... G01M 99/008 |

OTHER PUBLICATIONS

European Patent Office, Written Opinion for PCT/IB2019/057701, Jan. 30, 2020, 8 pages.

Indian Patent Office, First Examination Report for IN 201841034401, Oct. 26, 2020, 6 pages.

* cited by examiner

METHOD AND SYSTEM FOR MONITORING CONDITION OF A SAMPLE HANDLING SYSTEM OF A GAS ANALYSER

FIELD OF INVENTION

The present invention relates generally to gas analyzers and more specifically to condition monitoring of the sample handling system of the gas analyzers.

BACKGROUND

For gas analysis, collection of a sample of gas is made from a process pipeline and supplied to a gas analyser for example a gas chromatograph. This is performed by the sample handling sub system (also referred as the sampling system) of the gas analyser. The sampling system equipment continuously purifies the sample of gas (or gas sample) to remove solid and fluid contaminates in the gas sample. The purified gas sample is delivered by the sampling system to the gas analyzer. The remaining useful life of a gas analyzer can be reduced if the solid and fluid contaminates are not efficiently reduced and allowed to pass through to the gas analyser. Such solid and fluid contaminates as dust, condensates and corrosive substances further perturb the gas analysis and causes the gas analysis measurements to be inaccurate.

Sampling systems can typically be considered to consist of two parts: a) primary sampling system, and b) secondary sampling system. The gas sample from the process pipeline first enters the primary sampling system. Primary sampling system filters the gas using a high-pressure filter. The filtered gas passes through a Gas cooler which separates any moisture or other condensable gases present in the gas sample. The separated moisture or condensates will be collected in a condensate vessel. The secondary sampling system is typically provided with a fast loop/bypass system to decrease the response time of the total system. The conditioned sample gas from the primary sampling system enters the secondary sampling system. The condensate Monitor further removes any residual moisture in the gas sample. After the Condensate monitor the gas sample goes to the gas analyzer through a flow meter. The flow rate should be set for values that is in an acceptable range for the gas analyzer and is typically about 60 (+/−10) liters-per-hour (LPH). The gas analyzer then performs a measurement and analysis on the gas sample. Subsequent to the measurement and analysis on the gas sample, gas sample is safely vented out to the atmosphere or a gas venting area provided for this purpose or returned to the process pipeline.

Failure of any component in either the primary or secondary handling system will result either in wrong indication of the measurement values or analyzer sensors will get damaged and stop functioning. Presently, most sample handling systems have been designed such a fashion that in case sample does not meet the requirement of flow rate, temperature, moisture etc., interlocks controlled by a controller such as programmable logic controller will not allow the sample to go inside the analyzer to prevent the failure of the analyzer. The abnormal conditions are generally known when only when it occurs. In order to avoid such incidents to happen presently daily routine maintenance is carried out in every shift. This is not efficient and therefore not desirable.

SUMMARY

The above-mentioned shortcomings, disadvantages and problems are addressed herein which will be understood by reading and understanding the following specification.

In one aspect, the present invention provides a method for monitoring a condition of a sample handling system connected to a gas analyzer. The sample handling system comprising a sample line for supplying a gas sample to the gas analyzer, and at least one sample handling device on the sample line for operating on the gas sample, the method comprising: receiving measured operational parameters associated with the sample handling system obtained with a plurality of sensors provided in the sample line; determining estimated operational parameters associated with the sample handling system based on the measured operational parameters and data related to at least one of physical dimensions of the sample line and operating characteristics relating to the at least one sample handling device; comparing the measured operational parameters and the estimated operational parameters with reference values of operational parameters associated with the at least one sample handling device; at least one operating condition of the sampling handling system based on the result of comparison and based on rate of change of at least one of the measured operational parameters; and generating an alarm based on the determined at least one operating condition, wherein the alarm includes at least one event relating to faults, warnings about failure, estimation of life of at least one sample handling device, estimation of condition of the at least one sample handling device, and schedule of maintenance for at least one sample handling device.

In an embodiment, the sampling handling devices includes one or more temperature regulators for regulating the temperature of the gas sample, a pump for pumping the gas sample to the gas analyzer, a purge device for purging the sample line for clearing blockages in the supply line and one or more valves to regulate the flow of the gas sample in the sample line.

In an embodiment, the measured operational parameters associated with the sample handling system comprises at least one of heat tracer tube temperature, gas cooler temperature, gas sample flow rate, pressure data from pressure sensors across various points in the sample handling system.

In an embodiment, the data related to physical dimensions is inner pipe diameter of the sample line.

In an embodiment, the reference values are obtained from history data of measured operational parameters and estimated operational parameters associated with the sample pump.

In an embodiment, the sample handling system is monitored by a at least one of a Distributed Control System (DCS) connected to a Programmable Logic Controller (PLC), a sample handling monitoring device or a combination thereof.

In an embodiment, the DCS is hosted by a digital platform or one or more servers in a cloud system.

In another aspect of the present invention provides a condition monitoring system for monitoring condition of a sample handling system connected to the gas analyzer wherein the sample handling system comprises a sample line for supplying a gas sample to the gas analyzer, and at least one sample handling device on the sample line for operating on the gas sample, the at least one sample handling device includes one or more temperature regulators for regulating the temperature of the gas sample, a pump for pumping the gas sample to the gas analyzer, a purge device for purging the sample line for clearing blockages in the supply line and one or more valves to regulate the flow of the gas sample in the sample line, the condition monitoring system comprising: a network interface for receiving one or more sets of measurements from a plurality of temperature and pressure sensors connected at plurality of positions in the sample line; (a) one or more processors for: (i) obtaining operating characteristics of the at least one sample handling device based on the one or more sets of measurements and a model of the sample handling system; (ii) determining the condition of the sample handling system based on comparison of the operating characteristics of the at least one sample handling device against a plurality of reference values associated with the at least one sample handling device; and (iii) generating an alarm based on the determined condition of the sample handling system, wherein the alarm includes at least one event relating to faults, warnings about failure, estimation of life of at least one sample handling device, estimation of condition of the at least one sample handling device, and schedule of maintenance for at least one sample handling device.

In another embodiment, the one or more processors are further configured to one of predict and identify one or more faults in the sample handling system and recommend one or more corrective actions based on one or more faults.

In another embodiment, wherein the model of the sampling handling system is obtained from at least one of manufacturer provided characteristic curve of the equipment of the sample handling system and historical data associated with operating characteristics of the sample handling system.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

In the following detailed description, reference is made to the accompanying drawings that form a part hereof, and in which is shown by way of illustration of specific embodiments, which may be practiced. These embodiments are described in sufficient detail to enable those skilled in the art to practice the embodiments, and it is to be understood that other embodiments may be utilized, and that logical, mechanical, electrical and other changes may be made without departing from the scope of the embodiments. The following detailed description is, therefore, not to be taken in a limiting sense.

Figure 1:
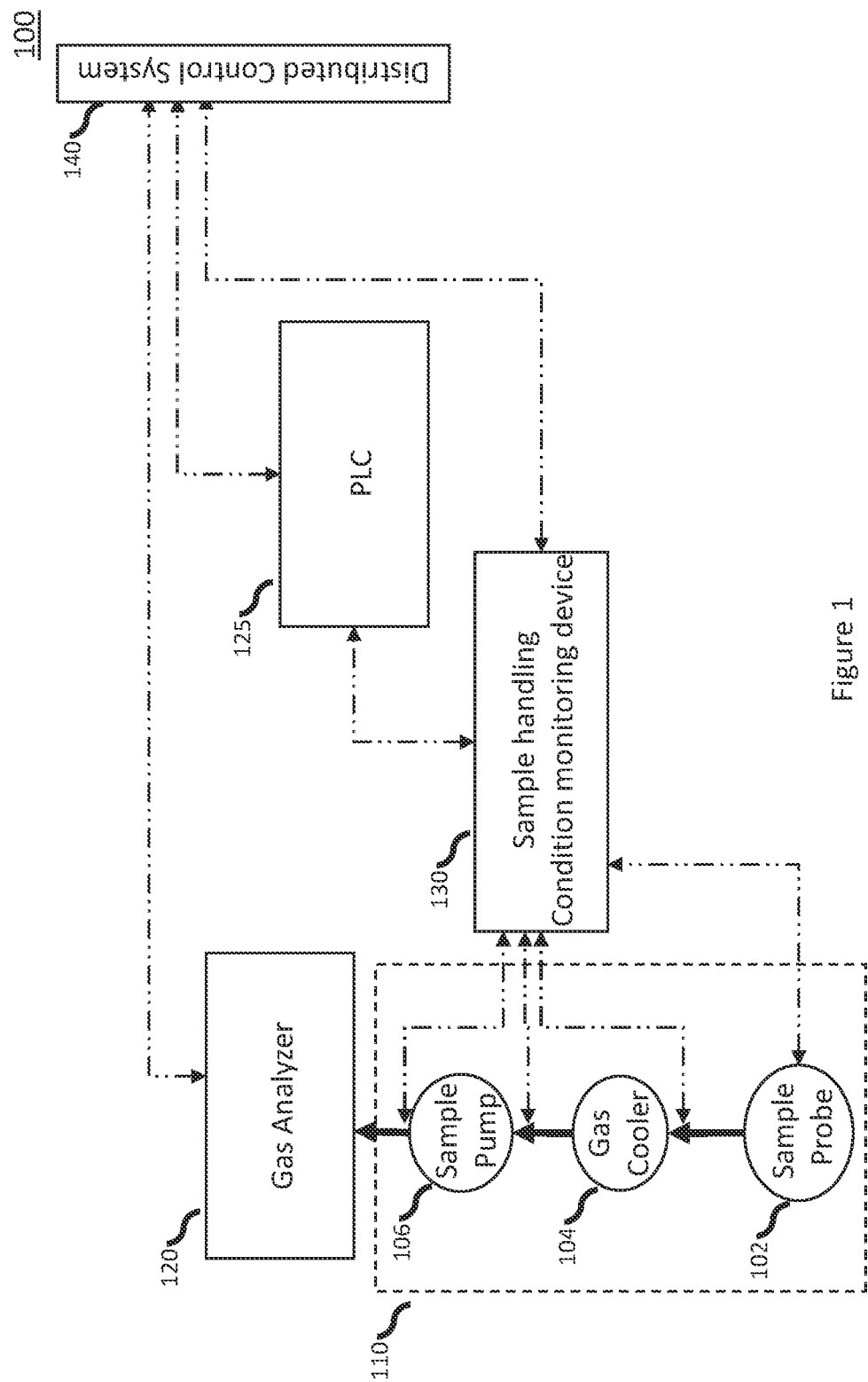
FIG. 1 illustrates a section 100 of an industrial plant comprising a gas analyser.

FIG. 1 illustrates a section 100 of an industrial plant with a gas analyzer 120. The gas analyser 120 is connected to a sample handling system 110. The sample handling system 110 is for providing gas sample from industrial process pipeline to the gas analyser for the gas analysis. The sample handling system 110 comprises a main sample line through which the gas sample is provided to the gas analyzer 120. A plurality of sample handling devices are connected to the main sample line for regulating various physical properties of the gas sample prior to supplying to the gas analyser 120. Such regulations (control) in this exemplary embodiment is carried out by a Programmable Logic Controller (PLC) 125. The PLC 125 is shown as a part of a Distributed Control System (DCS) 140. A sample handling condition monitoring device 130 is shown that receives plurality of measured values from sensors installed in the sample handling system. The sensors, sample handling condition monitoring device, PLC and DCS are communicatively connected through network system well known in the art relating to process control and automation system.

The DCS 140 can support further analysis of measured data from sensors to diagnose conditions of the sample line and sample handling devices. The DCS 140 can have operational models of various sample handling devices and can compare measured values and estimated values with reference data (thresholds) for assessing condition of one or more sample handling devices. The DCS 140 also logs the measured and estimated values (operational data) to create history data and make use of these data to obtain trends and perform analysis for diagnosis and predictive maintenance. Alarms and notifications related to operation states/event, conditions (health) of sample handling devices and maintenance can be generated by sample handling condition monitoring device and DCS.

The present invention discloses a method for monitoring the condition of the sample handling system connected to the gas analyzer by firstly receiving the measured operational parameters associated with the sample handling system like pressure, temperature, flow etc. is obtained from the sensors provided in the various points of the sample line.

Secondly, operational parameters are being estimated or the step of determining estimated operational parameters associated with the sample handling system is performed based on the measured operational parameters and data related to physical dimensions of the sample like inner pipe diameter of the sample line and operating characteristics relating to the sample handling device like physical characteristics. Then, comparing the measured operational parameters and the estimated operational parameters with reference values of operational parameters associated with the at least one sample handling device. And, determining operating condition of the sampling handling system based on the result of comparison and based on rate of change of at least one of the measured operational parameters. And finally generating an alarm based on the determined at least one operating condition, wherein the alarm includes at least one event relating to faults, warnings about failure, estimation of life of at least one sample handling device, estimation of condition of the at least one sample handling device, schedule of maintenance for at least one sample handling device.

In an exemplary embodiment, the plurality of sample handling devices includes one or more temperature regulating devices for regulating the temperature of the gas sample within the main sample line. For example, a gas cooler 104 is provided on the main sample line for cooling the gas sample and lowering its temperature. Similarly, the sample handling system includes a sample pump 106 for pumping the gas sample to the gas analyser, a purge device for clearing blockages in the supply line and one or more valves to regulate the flow of the gas sample in the sample line. The sample flow from process pipeline is extracted by the sample pump 106 and then the desired flow is sent to the gas analyzer 120. Balance is sent through the bypass line. The gas sample after passing through the gas analyzer 120 is finally vented to a safe place.

A plurality of temperature and pressure sensors are provided on the sample line. The measurements from the temperature and pressure sensors are provided to a sample handling condition monitoring device 130. The sample handling condition monitoring device 130 is provided with a network interface capability that enables the condition monitoring device to communicate with the devices or/and sensors in the sample handling system to receive measurement and status that help in determining condition/health. These devices or/and sensors could comprise the one or more valves or any control module for the valves, the temperature sensors, the pressure sensors, flow rate sensors (flow analyzers), gas coolers, sample pump, etc. The network interface capability further facilitates communicating with the mentioned devices or/and sensors using a variety of communication protocols (modbus, profibus, modbus/TCP, etc.) that may be supported by the different devices or/and sensors.

The condition monitoring device 130 utilizes different process measurements of sample flow such as pressure measurement, temperature measurement, flow measurement etc. The flow from pump discharge going to the analyzer is measured through a Flow sensor. Pressure sensors are installed before and after Sample Cooler and also after sample pump in order to measure the pressure at every instant. With the help of these measurements i.e. Pressure measurements and flow measurements, the condition monitoring device can derive the condition of the sample handling system and can also identify the following issues: choking in the sample flow tubes, malfunctioning or underperformance (degradation) of the sample pump, malfunctioning or underperformance of the sample cooler.

The value of the bypass flow is calculated by subtracting main flow from flow through the analyzer. Using continuous measurement of flow and pressure at various levels as described above, there could be decrease in flow at any level is due to the following reason: pump is not working properly, bypass line is leaking or jam somewhere, main sample line is getting chocked. The possibility of main sample getting chocked can further be verified by measuring differential pressure across Gas cooler outlet and filter inlet/probe outlet. This is derived with the help of Pressure transmitters installed across the Sample cooler and through certain computations in the condition monitoring device/units to determine the state or condition of the sample line and the associated sample handling devices. In case of main sample line getting chocked, this differential pressure will be followed by decrease in sample flow to analyzer. Similarly, the cooler temperature is also monitored continuously and in case of any increase in temperature indicates about the malfunction of the cooler. For example: If sensor temp is on high trend, it will mean the analyzer is not kept in air conditioned (A/C) room or the A/C is not functioning. Accordingly, alarm notifications can be generated for required correction by a user or through the PLC (controller) to properly regulate the related process parameter. Certain alarm notification can also be made to schedule maintenance.

Condition monitoring, diagnosis and prediction of sample handling devices and also analyzer health is based on flow & temperature measurement at various level (locations) based on the type of sample handling system installed. The type of sample handling system is based on the process requirement of the Process Plant.

The sample handling condition monitoring device 130 is one means of monitoring the sample handling system. In another exemplary embodiment, sensors for obtaining operation parameters are implemented directly with the DCS and the function of condition monitoring of the sample handling system is done by the DCS. In another embodiment the PLC may also perform condition monitoring of the sample handling system and can function in coordination with the DCS for diagnosis and predictions related to the sample handling devices and the sample line. In other exemplary embodiments, the condition monitoring device, a computational unit of the DCS for condition monitoring including the PLC, and a condition monitoring function or tool implemented in a server of DCS or in a general purpose computer for condition monitoring can serve as a hardware/software unit for condition monitoring of the sample handling system and such units can be referred individually as a condition monitoring unit and collectively as condition monitoring system in the referred exemplary embodiments. Such condition monitoring system includes sensors, actuators (valves, regulators), communication modules including network interface, processors (included in PLC, DCS or cloud servers) and memory (storage space) for condition monitoring functions.

Figure 1A:
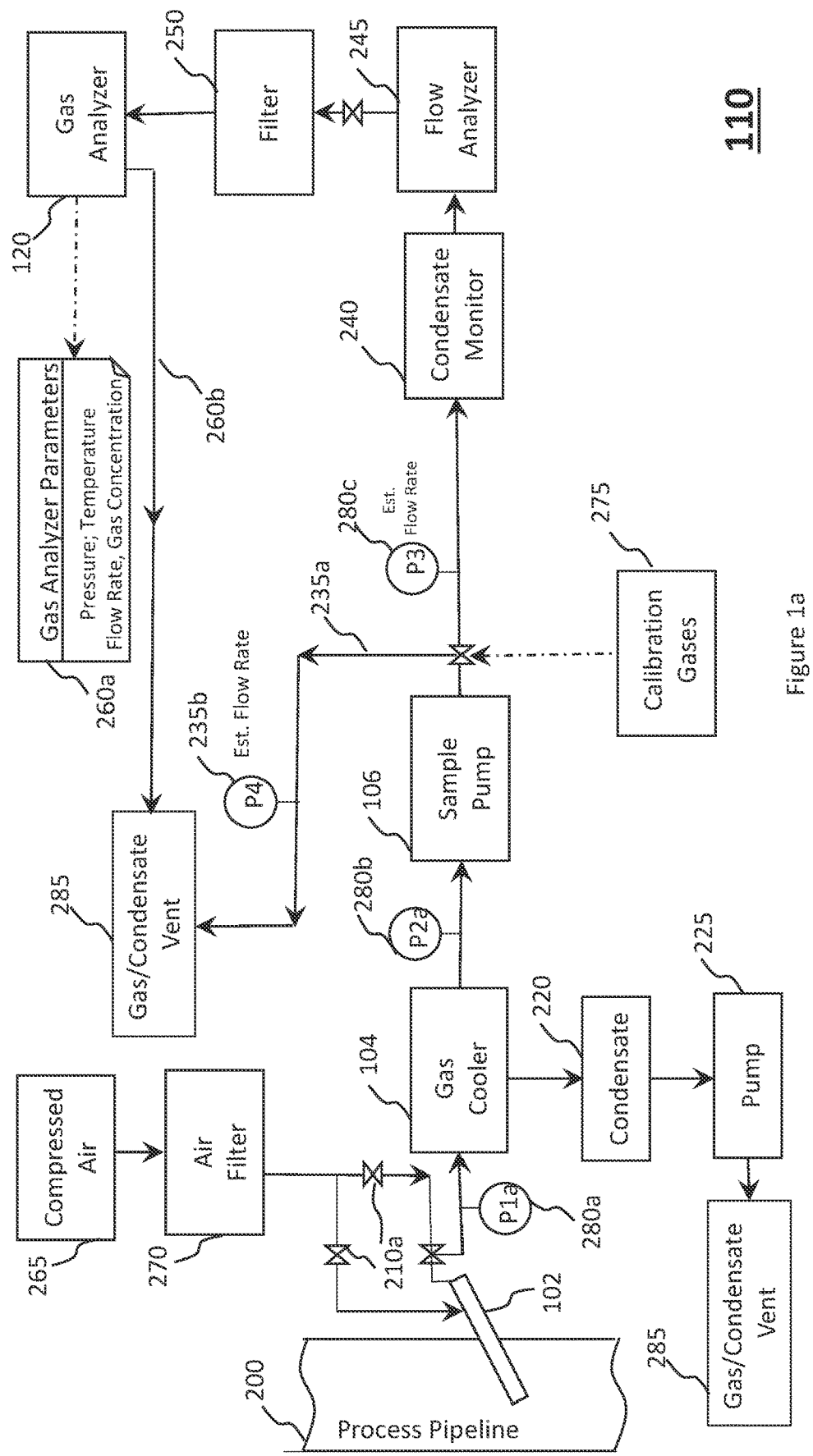
FIG. 1a illustrates a detailed view of the sample handling system.

The description related to FIG. 1, above, illustrated a section of an industrial plant comprising a gas analyser. FIG. 1*a* provides further details into the sample handling system 110 and operational parameters such as flow rate, pressure, temperature that are either measured or estimated based on well-known techniques for further analysis relating to diagnosis and prediction of condition with the sample handling condition monitoring device 130. Furthermore, few examples of measurement and technique to assess a condition in the sample handling system will be discussed that will provide working of the sample handling condition monitoring device 130 using these measured parameters to assess the health and performance of various components of the sample handling system. The provided techniques are said to be examples and are implemented in a condition monitoring unit/system using electronic circuitry or with use of software/firmware provided in a memory of a computer that function in a programmable computer processor system. This assessment of the health and performance of various components of the sample handling system facilitates fault isolation and subsequent fault correction either through an automated mechanism (control) or through a recommended fault correction procedure carried out by a maintenance personnel.

FIG. 1*a* shows a detailed illustration of a sample handling system 110 and gas analyser 120, in accordance with embodiments of the present invention. A sample pump 106 provided to the sample handing system 110 creates a negative pressure between the sample pump 106 and the sample probe 102 adapted with a process pipeline 200 to extract a sample of the process gas and transmit it to the gas analyser 120.

The extracted sample gas is typically at a higher pressure and elevated temperature than that suitable for the gas analyser 120. Additionally, the extracted gas also consists of various solid and fluid contaminants such as dirt, moisture, corrosive substances, other condensable gases, etc. that can cause inaccuracies and faults in performance of the gas analyser 120. The contaminants and gas sample flow conditions (temperature, pressure, flow rate, etc.) that are unsuitable for operation of the gas analyser could render the gas analyser 120 readings to be unstable, report drifting and inaccurate measurement values, have inconsistent response times, etc. Parameters measured or estimated with regard to the sample gas refer to the quality of sample gas and are useful to determine and predict condition of the sample line, sample handling devices and gas analyzer. Therefore, before the gas sample reaches the gas analyser 120, it is conditioned to regulate its temperature, pressure, and flow rate and also remove the various contaminants such as the ones mentioned above. This ensures the gas sample delivered at the gas analyser 120 is pure gas phase sample devoid of any contaminants and suitable for accurate measurements and analysis by the gas analyser.

It is critical, therefore, that the various components that constitute the sample handling system such as valves, gas coolers, heaters, pumps, sensors for temperature, pressure, flow rate, moisture etc. be continuously monitored to ensure their correct functioning and pre-emptively take corrective actions on any of the components before a malfunction disrupts the entire process. The measurement of parameters related to quality of gas, the operation data/states including data related to maintenance of various sample handling devices and sample line are useful to access the condition of the gas analyzer.

The gas sample extracted by the sample probe 102 flows through a heat traced tubing or pipe conduit between the sample probe 102 and the gas cooler 104. The heat traced tubing is configured to typically operate at temperatures that prevents condensation of moisture or any other condensable gases (such as Sulphur). For instance, the heat traced tubing could be maintained at about 80° C.

The gas sample is transmitted with the aid of multiple valves 210a all along the sample handling system. One or more filters (not shown) such as particulate filters and sintered metal filters also facilitate upkeep of the sample handling system 110 by removing different contaminants that might cause plugging because of dirt or other sediment deposits.

The gas sample is transmitted to the gas cooler 104. The temperature of the gas cooler 104 is regulated to facilitate condensing of moisture and other condensable gases in the gas sample. The condensates 220 are removed out of the system using a peristaltic pump 225 and to a gas/condensate vent 285. Therefore, only the gases that need to be analysed are allowed to transmit along rest of the sample handling system.

The filtered, cooled, and condensates removed gas sample flows through the sample pump 106 and into the condensate monitoring 240 unit that senses for various condensates and dew formation. Measurements from the condensate monitoring can be used to tune the performance of the sample gas cooler 104 through its parameter setting (temperature, flow rate, etc.).

After passing through the condensate monitor 240, the gas sample flows through a flow analyser 245 that measures the volumetric flow rate of the gas sample. The volumetric flow rate is regulated to be in a range acceptable to the specific gas analyser 120 unit. In order to regulate the gas sample flow rate, a valve in the gas sample bypass line 235a is opened/closed to maintain the gas flow rate to the gas analyser 120.

An estimated flow rate using pressure 235b value is also obtained in the gas sample bypass line 235a to facilitate accurate flow rate regulation towards the gas analyser 120. The estimated flow rate using pressure value is obtained from pressure sensor measurements at various points along the gas sample bypass line 235a and also the gas sample line towards the gas analyser 120. Additional information that facilitates accurate estimated flow rates using pressure 235b value include the pipe diameter, flow rate measurement from the flow analyser 245. One or more well-known principles involving mass and energy conservations, such as the Bernoulli's equations, can be used to estimate the flow rate using measured flow pressure value and knowledge of the pipe inner diameter that is transporting the gas samples.

In the gas sample bypass line 235a, eventually the gas sample is either vented to a specific gas/condensate vent 285 area or the gas is returned to the process pipeline 200.

The gas sample passes on from the flow analyser 245 to the filter 250 before finally reaching the gas analyser 120. The filter 250 facilitates eliminating of any residual contaminants such as dirt, moisture, etc.

The thus conditioned gas sample enters the gas analyser 120 unit where the gas sample has the acceptable constitution (pure gas phase samples) and flow conditions (flow rate, pressure, temperature). The gas analyser 120 measures and records one or more parameters 260a such concentration of each gas (carbon monoxide, nitrous oxide, Sulphur dioxide, etc.) in the gas sample, analyser pressure, analyser temperature, analyser flowrate, etc.

Once the measurements by the gas analyser 120 on the gas sample is complete, the gas sample is either vented through the gas sample vent line 260b to a specific gas/condensate vent 285 area or the gas is returned to the process pipeline 200.

In addition to the above described components and processes involved in the sample handling system, it is also provided with at least one purging unit. The purging unit could be a source of compressed air 265. The compressed air 265 is passed through an air filter 270 to remove any particulates or contaminants before using to back-purge the sample probe 102 to remove any dirt, debris, clog, or plugging of the sample probe 102.

The gas analyser 120 and the sample handling system 110 is also provided with calibration gases 275 that are used to recalibrate the gas analyser that ensures accurate measurements with reduced uncertainty by automatically correcting for any measurement drifts.

As was described with reference to FIG. 1, there are parameters measured at various points in the sampling handling system 110 that are transferred to the sampling handling condition monitoring device 130. Some of the parameters and their location of measurement are highlighted in FIG. 1a as pressure (P1a) 280a upstream to the gas cooler 104, pressure (P2b) 280b upstream to the sample pump 106 and downstream to the gas cooler 104, pressure 280c upstream to the condensate monitor 240 and downstream to the sample pump 106. The pressure in each case is measured using a pressure sensor.

In addition to the measured pressure values, the sampling handling condition monitoring device 130 also estimates the flow rates at various points along the gas sample path between the sample probe and the gas analyser.

The measured data is received by the sample handling condition monitoring device 130 and further data such flow rates at various points on the gas sample line can be estimated by the condition monitoring device. The measured data is also referred as measured operational parameters and the estimated data is also referred as estimated operational parameters. The measured data, estimated data and data associated with one or more sample handling devices, all together can be referred to as operational data. Thus, operational data comprises of various operational parameters of the sample handling system and the gas analyser, and data related to physical dimensions or physical characteristics (operating characteristics) relating to one or more sample handling devices. Examples of such operational parameter could be heat tracer tube temperature, gas cooler temperature, gas sample flow rate, pressure data from pressure sensors across various points in the system, etc. Some examples of data related to physical dimensions is inner pipe diameter, length of the sample line, and location of measurement in the length of the sample line etc., and an example of data related to physical characteristic of one or more sample handling device is sample pump characteristics. The data related to physical dimension and physical characteristics are used for estimation of operational parameters using measured operational parameters.

Figure 2:
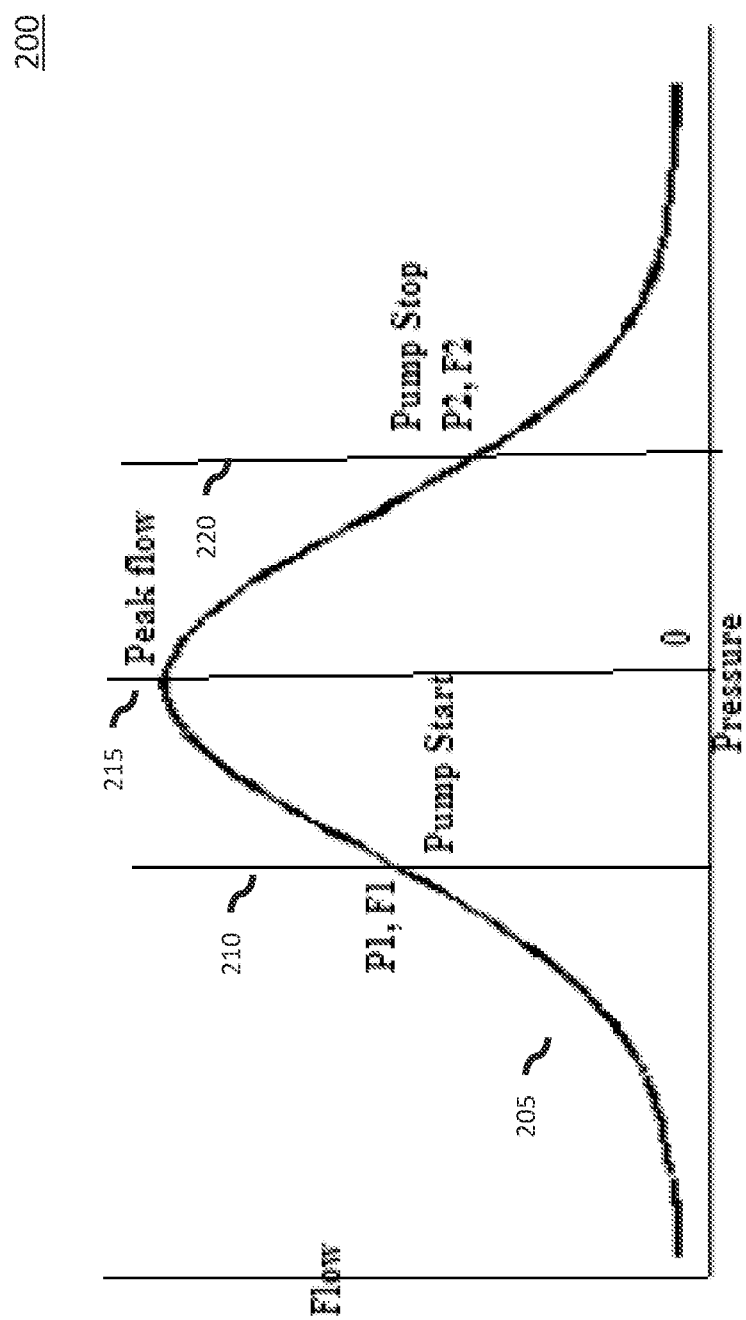
FIG. 2 illustrates operating characteristics of a pump of a sample handling system.

Additionally, the operational data also contains data associated with various events such as faults, warnings about failure/degradation, life estimation (that is expected failure after a period of time) of one or more sample handling devices, condition (health) of one or more sample handling devices, schedule for maintenance of one or more sample handling devices etc. FIG. 2 illustrates operating characteristics of the sample pump 106. The estimated flow rate at 235b (FIG. 1a) in the gas sample bypass line 235a, estimated flow rate at 280C downstream to the condensate monitor 240 and upstream to the sample pump 106 is obtained using the operating characteristic of the sample pump. The abscissa in FIG. 2 represents the gas pressure measured at one or more points such as at P1a 280a in FIG. 1a. The ordinate in FIG. 2 represents flow rate associated with the sample pump 106 for various values of pressures. The operating characteristic curve is made use for determining the flow (estimated operational parameters) corresponding to the suction and discharge pressure. It may be well known to a person skilled in the art that such characteristic curve would be different depending on the make of the sample pump. The operating characteristics of the sample pump (sample handling devices) for the respective makes/models are stored in the DCS and are used for various computations related to operations of the sample handling system including diagnostics and predictive maintenance.

In this example, for the make of the sample pump, the operating characteristics of the sample pump is thus used to compute the flow and also check whether the both sides of the pump are balanced using pressure and flow data by comparing the values of operational parameters (pressure and flow) obtained at suction side and discharge side. Here the values of pressure and flow at one side (for example suction side) is used as reference values to compare with the respective values at the other side (in this example, discharge side). The reference values for either or both sides can also be obtained from history data of measured operational parameters and estimated operational parameters associated with the sample pump. These operational parameters can also be produced as reference characteristic values. In case of an imbalance, the sample handling condition monitoring device/DCS can determine through analysis a condition of building of back pressure on the pump and accordingly generate alarms relating to the sample pump. Estimates relating to back pressure obtained over a period of time can be used to predict the life of the sample pump including the diaphragm.

With use of operating characteristics such as that provided in FIG. 2, the following observations and inferences can be made by the condition monitoring unit:
P1—Pressure after Sampler Cooler,
P2—Pressure after Sample pump,
P0—Pressure before sample Cooler,
F1—Flow through the Sample pump to the Analyzer (does not include bypass flow), For conditions where P1 and P2 are same, but F1 reduces, the condition monitoring device can determine and provide alarm notification that the pump needs maintenance. Similarly, where P1 increases, P2 remains same, P0 remains same and hence F1 reduces, condition monitoring device determines that there is choking in sample the line before sample pump. Also, if P2 increases, P1 remains same, P0 remains same and hence F1 reduces, condition monitoring device is able to determine that there is a choking in the line after sampler cooler and before Pump outlet. And also, if P1 increases, P2 remains same, P0 also increases proportionately and hence F1 reduces, there is a choking before Sampler cooler.

When the pressure and the flow rate reach a specific value as represented by (P1, F1) 210, the sample pump 106 is started by the PLC. Values of pressure and flow rate below (P1, F1) 210 is represented by region 205. The sample pump 106 therefore transfers the gas sample at a pressure and flow rate set above (P1, F1) 210. The flow rate of the gas sample reaches a peak flow 215 value at a pressure value represented by 0. Beyond this, the pressure values are positive. However, the gas sample flow rate begins to drop as the gas sample pressure increases. The gas sample flow rate goes to zero as the gas sample pressure increases and approaches the ambient pressure values. At the positive pressure shown as P2, the gas sample flow rate value reaches F2, and at this point of (P2, F2) 220 the sample pump is turned off by the PLC. The sample pump 106 therefore is configured to obtain a gas sample flow rate above F1 (such as 40 litres per hour) at pressure P1 and below F2 (such as 60 litres per hour) at pressure P2.

Every data, as described above, is date and time stamped. Events data could involve user calibration event, sample pump start, and sample pump stop time, firmware version and update history, history of restore to factory settings, service or maintenance logs, etc. Faults and warnings could be associated with measured temperature being above or below upper and/or lower limit, offset drift exceeds permissible range, flow fault such as flow fail, unstable measured value readings, etc. History of such data acquired in various operating conditions of the sampling handling system and gas analyser aids in monitoring and diagnostics of the system. The various operating conditions could involve the healthy or normal operating phase of the system, degraded operating state, and failure state.

On determination of an operating condition of the sampling handling system an alarm is generated if the condition requires attention or correction. An example of an alarm pertaining to detection of a fault in a sample handling device is when a condensate fault is detected as a result of moisture being detected in the sample line and can lead to tripping of the sample pump. An alarm is generated, and alarm notification is provided to check the condensate monitor and replace the condensate filter element in order to restore the system. Similarly, an example pertaining to diagnostics is generating an alarm notification when based on the determined operating condition from values of pressure and temperature at the Probe Filter a choking is suspected at tapping level and the Probe Filter is likely to be completely choked within next few hours. The alarm can notify that the Probe Filter is to be serviced immediately. Another example is a prognostics based alarm notification where a prediction of a developing state/condition of a sample handling device is made. In such analysis, the present and past operational data of the associated sample handling device is used to determine rate of change of measured/estimated operational parameter and through extrapolation of the rate of change and comparison with a preset threshold value representative of a condition of failure or fault, life and condition assessment can be performed. Such information is also useful to perform predictive maintenance. For example, choking inside the gas cooler is suspected from the values of the operational parameters of pressure and temperature and based on the rate of change of these operational parameters, it is possible to estimate a condition where the gas cooler can get completely choked to cause a trip condition over a period of time in the future. And also, a prescriptive based alarm notification is provided on such detection of choking inside the gas cooler that the cooler path needs to be checked & cleaning to be performed (alarm for notification of a condition requiring maintenance in a near future).

Another example of an alarm is reporting of deterioration of sample pump. Deterioration condition can be estimated by monitoring the rate of change of the discharge flow, and if the discharge flow is on a decreasing trend from normal flow then deterioration of sample pump can be suspected. The rate of change of discharge flow value can be extrapolated and compared with a reference value used for interlocking (stop usage) by the PLC to predict a state of condition (deterioration of sample pump) and developing condition for fault because of sample pump deterioration. The alarm can notify an upcoming need for service of the sample pump and to ensure corrections for good sample flow to analyzer.

Figure 3:
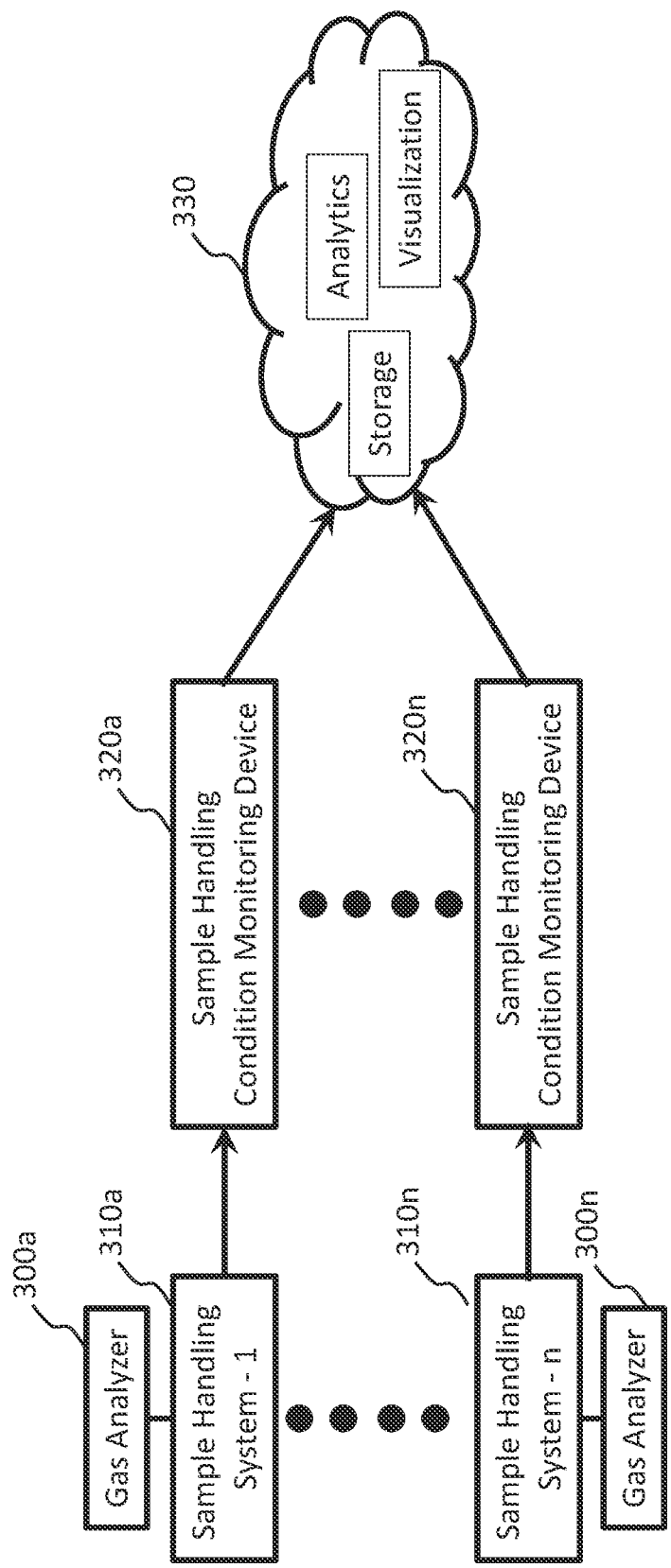
FIG. 3 illustrates representative sample handling system and gas analyzer unit with the sample handling condition monitoring device and a cloud computing interface.

In another embodiment of the invention, data on the parameters associated with the sample handling system and the gas analyser are exported to a cloud computing system that functions as a condition monitoring unit/system for further analytics of the acquired operational data. FIG. 3 illustrates a representative sample handling system and gas analyzer with the sample handling condition monitoring device provided with a cloud computing system, in accordance with various embodiments of the present invention.

Operational data from a plurality of the gas analyzers 300a, 300n and their corresponding sample handling system 310a, 310n are first gathered by their corresponding sample handling monitoring devices 320a, 320n. The operational data from each system such as 300a and 310a is date and time stamped and additionally also tagged with the instrument ID (such as serial number) and firmware versions through which the data is generated.

All the above obtained data is exported to a cloud computing system 330 that is configured with storage and processing capabilities. Various data analytics can be performed on the data stored in the cloud computing system 330. Analytics performed could be descriptive, predictive, and prescriptive and corresponding alarm notification can be generated and issued to the condition monitoring device or in a human machine interface (including handheld devices such as a mobile phone) of the condition monitoring unit. Such analytics facilitates anomaly detection and can enable corrective measures through automated setting of operational parameters or through other maintenance activities to restore full operating potential of the sample handling system and gas analyzer.

Analytics on the time series of such monitoring operational data can reveal complex correlation from analysing the fluctuations of different time scales and noise. Real-time and historical views of the operational data and their time series analysis facilitates identifying long-term trends to provide likely indicators of degradation in condition monitoring operational data. The trends in various operational parameters can be compared with reference values (for example, minimum and maximum value limits) of the corresponding operational parameters.

If one or more operational data parameters are outside the minimum and maximum limit bounds (reference values), then the gas analyser and the sample handling system could be unhealthy, and an alarm is sent to the customer/operator on the detected anomalies. With the operational data gathered from multiple gas analysers and sampling handling systems, the visualization tool in the cloud computing system can generate distributions of the various operational parameters corresponding to various operating states of the gas analysers and sample handling systems. The different operating states could correspond to the heathy or normal state, degradation state or non-optimal state, failure state etc. Analysis of such operational data for various parameters can aid accurate estimation of the any component in the system that might be approaching failure or non-optimal performance characteristics. This information can then be used to take corrective measures either automatically through settings of various operational parameters or through recommendation of corrective measures sent to the customer/operator.

This continuous monitoring of multiple operating data parameters enables accurate predictability of failures in various components of the gas analyser and sample handling system. Estimation of a condition of sample handling devices including life estimation of the sample handling devices is obtained using rate of change of measured operational parameters and estimated operational parameters obtained over time (includes extrapolation) and by comparison with reference values (threshold). This facilitates improved maintenance planning and efficiency to reduce overall maintenance costs and improve availability of the system and maximize the remaining useful life of the system components.

Figure 4:
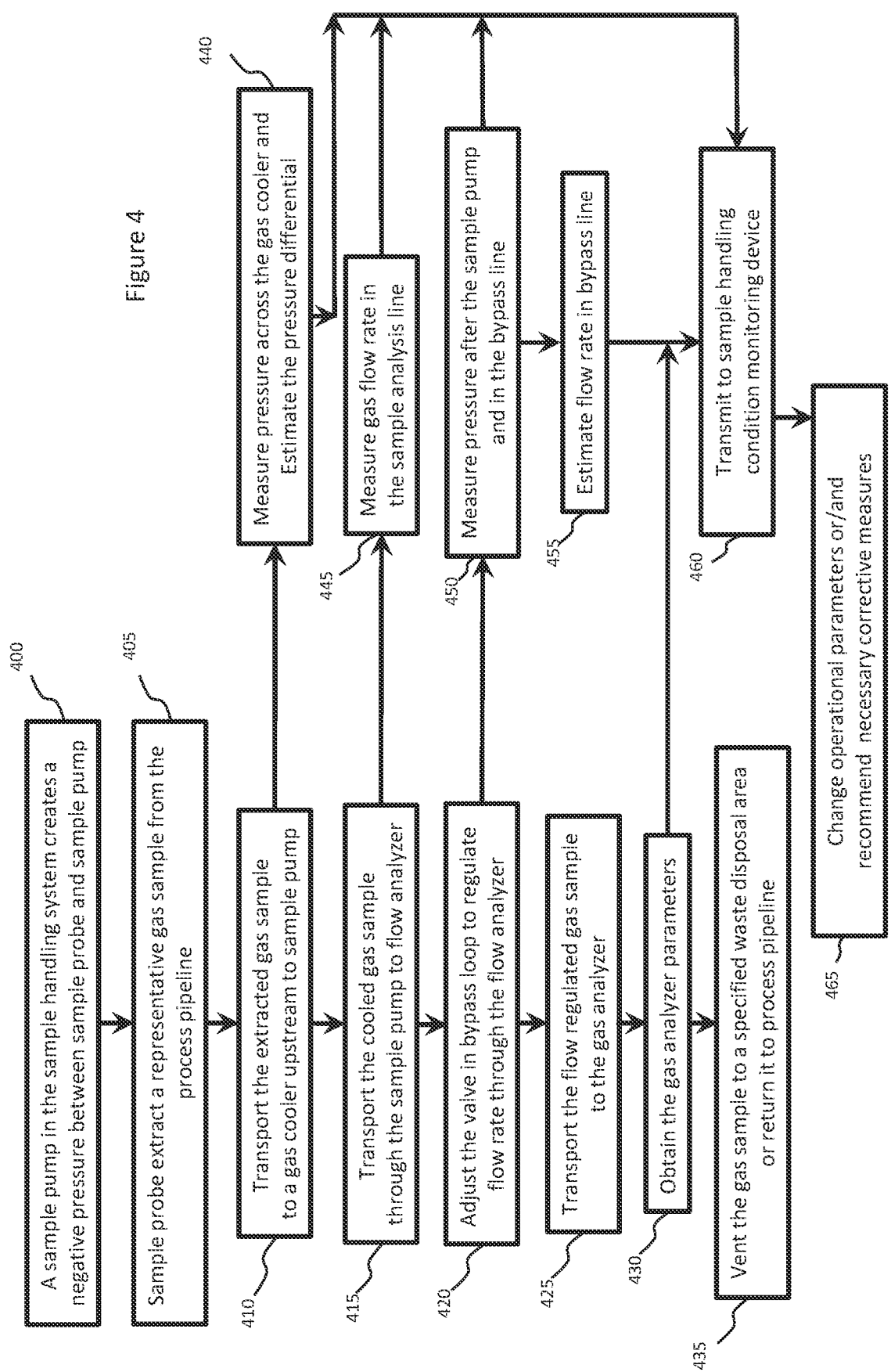
FIG. 4 illustrates a block diagram for a method of monitoring the sample handling system, in accordance with an exemplary embodiment of the present disclosure

Representative use case examples of the present invention are described along with an overview of the method of condition monitoring of the sample handling system and the gas analyzer. FIG. 4 shows an illustration of a block diagram for a method of monitoring the sample handling system, in accordance with an exemplary embodiment of the present disclosure. Only the relevant details necessary for the illustrating the case exampled are represented.

In reference, to FIG. 4, in step 400, the sample pump in the sample handling system creates a negative pressure between sample probe and sample pump. This causes the sample probe, which is adapted within the process gas pipeline, to extract a gas sample from the process gas pipeline and divert it towards the sample pump in the sample handling unit. Step 405 represents the method where the sample probe extracts a representative gas sample from the process gas pipeline. In step 410, the extracted gas sample that is diverted towards the sample pump, is transported to a gas cooler that is upstream to the sample pump. This facilitates purifying the gas sample off contaminants such as moisture or other condensable gases. In step 445, pressure is measured across (before and after) the gas cooler. This enables estimating the pressure differential across the gas cooler. In addition to the pressure monitoring, the sample handling condition monitoring system also monitors and logs the temperature at the gas cooler. All the measured operational data are transmitted to the sample handling condition monitoring device, as indicated in step 465, where the data is continuously logged, and analytics performed.

If a trend is observed that is indicative of reduced cooling performance, the sample handling condition monitoring device/unit can send out an alarm or alert to the customer/ operator to, for instance, performance maintenance on the condenser fins of the gas cooler unit. As the gas cooler temperature is continuously monitored, any increase in temperature could indicate malfunction of the gas cooler. For example: If the temperature is on high trend, it could mean the ambient temperature of the gas analyser system is high and the air conditioner might be switched off. The sample handling condition monitoring device can then send alert signal to the customer/operator.

If the estimated differential pressure is beyond the acceptable limit, it could be indicative of block or plugging in the sample gas flow. This could exhibit a pressure drop that gives low vacuum (negative pressure) in the system and a higher vacuum (negative pressure) in the pump. The sample handling condition monitoring device can automatically clear various contaminations in the sample gas line by purging the sample probe with high pressure (5-10 Kg/cm2) compressed air jet. Therefore, using current and historical operational data, the sample handling condition monitoring device is able to derive the condition of the sample handling system and can identify any faults such as choking (degradation) or plugging in the sample flow lines or tubes. The sample handling condition monitoring device can then take automated corrective actions such as adjustment of the purge air pressure and purging timing for the cleaning of the sample probe, retraction of the sample probe and cleaning of the probe with a pneumatically activated cleaning system depending upon the probe feedback.

Based on the historical trend of the measured pressure values, if the vacuum (negative pressure) loss is observed to be gradual over a period of time, this could indicate a worn pump and the sample handling monitoring system can automatically adjust to reduce loading on the pump while keeping the acceptable flow rate within the range of the gas analyser. Simultaneously, the sample handling monitoring system can alert the customer/operator of the maintenance requirement for the sample pump.

Therefore, as described above, using these measurements of three pressure values—upstream to the gas cooler, midstream between the gas cooler and the sample pump, and downstream to the sample pump—and flow rate measurements midstream between condensate monitor and gas analyser, the sample handling condition monitoring device can derive the condition of the sample handling system and can also identify the following issues: choking in the sample flow tubes, malfunctioning or underperformance of the sample pump, malfunctioning or underperformance of the sample cooler.

In continued reference to FIG. 4, in step 415 the cooled gas sample is transported from the gas cooler to the flow analyser which is upstream to the sample pump. In step 450 the flow analyser measures the volumetric flow rate in the gas sample line. This measured volumetric flow rate is transmitted to the sample handling condition monitoring device in step 465. The data is continuously logged, and analytics performed.

The gas analyzer has an acceptable range for the volumetric gas flow rates and therefore the gas flow rate must be regulated to be within that acceptable range. In step 420, a valve in the gas sample bypass loop is adjusted to regulate the volumetric flow rate of the gas sample flowing through the gas analyzer. In step 455, the pressure of the gas sample is measured both downstream to the sample pump and in the gas sample bypass loop. The measured pressure values are transmitted to the sample handling condition monitoring device in step 465. The data is continuously logged, and analytics performed.

The measured value for the pressure in the bypass loop and the sample analysis line along with the measured volumetric gas flow rate in the sample analysis line is used, in step 460, to obtain an estimate of the volumetric gas flow rate in the sample bypass line. The data values are transmitted to the sample handling condition monitoring device in step 465.

In step 425, the flow rate regulated gas sample is transported to the gas analyser for the analysis on the pure gas phase of the sample that is conditioned to be at a flow rate, pressure, and temperature that is acceptable to the gas analyser.

In step 430, analysis on the gas sample by the gas analyser is completed and outcome of the gas analyser parameters are transmitted to the sample handling condition monitoring device in step 465. The parameters from the gas analyser can comprise of the various gas concentrations, temperature, pressure, and flow rate in the gas analyser, etc. All of these parameters are continuously logged to the sample handling condition monitoring device.

In step 435, once the gas analysis on the gas sample is complete, all the gas sample is vent out to specified waste disposal area or returned to the process gas pipeline. If the gas analyser measurements display specific trends of drift in measured values, the sample handling monitoring device can automatically trigger a recalibration of the gas analyser using the calibration gases provided with the system. However, if the sample handling monitoring device observes an increasing trend in the gas analyser pressure, the sample handling monitoring device can prioritize a high-pressure purge of the gas sample vent line to resolve the issues of measurement drift and possible chocking or plugging in the gas sample vent line. Thus, the recalibration of the gas analyser and purging of the various gas sample lines (such as sample probe, gas sample vent line, etc.) can be adaptive to the current condition of the sample handling system.

In step 460, the sample handling monitoring devices acquires the operational parameters such as described above and performs analytics as was described in reference to FIGS. 2 and 3. Step 465 highlights actionable outcome of such analytics. Various operational parameters are changed or/and recommend as necessary corrective measures to keep the system of gas analyser and sample handling system in healthy operating state and maximize the remaining useful life of various components in the system through pro-active implementation of corrective measures.

In an embodiment, the condition monitoring device utilizes historical data. Using the historical data, the condition monitoring device is able develop a model of the sample handling system and take automated corrective actions such as adjustment of the purge air pressure and purging timing for the cleaning of the sample probe, retraction of the sample probe and cleaning of the probe with a pneumatically activated cleaning system depending upon the probe feedback, recalibration of the analyzer based on the measured values and the periodic data collected, adjustment of the needle value to maintain the optimum flow rate at the analyzer.

The method of monitoring the condition of the sample handling system can be performed by the sample handling condition monitoring device or the DCS or in combination of sample handling condition monitoring device and the DCS. The DCS can be hosted by a digital platform or one or more servers in a cloud system.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A method for monitoring a condition of a sample handling system connected to a gas analyzer, the sample handling system comprising a sample line for supplying a gas sample to the gas analyzer, and at least one sample handling device on the sample line for operating on the gas sample, wherein the method is applied to a condition monitoring system, the method comprising:

receiving, by a network interface of the condition monitoring system, measured operational parameters associated with the sample handling system obtained with a plurality of sensors provided in the sample line, the measured operational parameters comprising a plurality of time series data associated with the sample handling system;

estimating, by one or more processors of the condition monitoring system, operational parameters associated with the sample handling system based on the measured operational parameters and data related to at least one of physical dimensions of the sample line and operating characteristics relating to the at least one sample handling device;

determining, by the one or more processors of the condition monitoring system, an operational parameter trend comprising a rate of change of the measured operational parameters;

comparing, by the one or more processors of the condition monitoring system, the measured operational parameters, the operational parameter trend, and the estimated operational parameters with reference values of operational parameters associated with the at least one sample handling device, wherein the reference values are obtained based on historical operational data comprising historically measured operational parameters, and wherein the historically measured operational parameters comprise generated distributions of a second plurality of time series data measured before the measured operational parameters;

determining, by the one or more processors of the condition monitoring system, at least one operating condition of the sample handling system based on a result of the comparison and based on the rate of change of at least one of the measured operational parameters;

generating, by the one or more processors of the condition monitoring system, an alarm based on the determined at least one operating condition, wherein the alarm includes at least one event relating to faults, warnings about failure, an estimation of life of the at least one sample handling device, an estimation of a condition of the at least one sample handling device, and a schedule of maintenance for the at least one sample handling device; and based on the at least one operating condition of the sampling handling system, controlling, by the one or more processors of the condition monitoring system, the sample handling system to perform one or more automated corrective actions, and wherein the operating characteristics relating to the at least one sample handling device comprise operating characteristics of at least one sample pump.

2. The method as claimed in claim 1, wherein the at least one sample handling device includes one or more temperature regulators for regulating the temperature of the gas sample, a pump for pumping the gas sample to the gas analyzer, a purge device for purging the sample line for clearing blockages in the supply line and one or more valves to regulate the flow of the gas sample in the sample line.

3. The method as claimed in claim 1, wherein the measured operational parameters associated with the sample handling system comprises at least one of heat tracer tube temperature, gas cooler temperature, gas sample flow rate, pressure data from pressure sensors across various points in the sample handling system.

4. The method as claimed in claim 1, wherein the data related to physical dimensions is inner pipe diameter of the sample line.

5. The method as claimed in claim 1, wherein the reference values are obtained further based on estimated operational parameters associated with the sample pump.

6. The method as claimed in claim 1, wherein the sample handling system is monitored by a sample handling condition monitoring unit comprised in at least one of a Distributed Control System (DCS) connected to a Programmable Logic Controller (PLC), a sample handling monitoring device, and a combination thereof.

7. The method as claimed in claim 6, wherein the DCS is hosted by a digital platform or one or more servers in a cloud system.

8. A condition monitoring system for monitoring a condition of a sample handling system connected to a gas analyzer, wherein the sample handling system comprises a sample line for supplying a gas sample to the gas analyzer, and at least one sample handling device for operating on the gas sample supplied by the sample line, the at least one sample handling device includes one or more temperature regulators for regulating the temperature of the gas sample, a pump for pumping the gas sample to the gas analyzer, a purge device for purging the sample line for clearing blockages in a supply line and one or more valves to regulate the flow of the gas sample in the sample line, the condition monitoring system comprising:

a. a network interface for receiving one or more sets of measurements from a plurality of temperature and pressure sensors connected at a plurality of positions in the sample line;

b. one or more processors for:

i. obtaining operating characteristics of the at least one sample handling device based on the one or more sets of measurements and a model of the sample handling system, the measurements comprising a plurality of time series data associated with the sample handling system, wherein the operating characteristics comprise a rate of change of the measurements;

ii. determining the condition of the sample handling system based on a comparison of the operational parameter trend and the operating characteristics of the at least one sample handling device against a plurality of reference values associated with the at least one sample handling device, wherein the plurality of reference values are obtained based on historical operational data comprising historical measurements, and wherein the historical measurements comprise generated distributions of a second plurality of time series data measured before the measured operational parameters;

iii. generating an alarm based on the determined condition of the sample handling system, wherein the alarm includes at least one event relating to faults, warnings about failure, an estimation of life of the at least one sample handling device, an estimation of a condition of the at least one sample handling device, and a schedule of maintenance for the at least one sample handling device; and iv. based on the condition of the sampling handling system, controlling the sample handling system to perform one or more automated corrective actions, wherein the operating characteristics of the at least one sample handling device comprise operating characteristics of at least one sample pump.

9. The condition monitoring system as claimed in claim 8, wherein the one or more processors are further configured to predict and identify one or more faults in the sample handling system and determine the one or more automated corrective actions based on the one or more faults.

10. The condition monitoring system as claimed in claim 8, wherein the model of the sample handling system is obtained from at least one of manufacturer provided characteristic curve of the equipment of the sample handling system and the historical operational data associated with operating characteristics of the sample handling system.

11. The method as claimed in claim 1, wherein controlling the sample handling system to perform the one or more automated corrective actions comprises:

providing instructions to the sample handling system to adjust a purge air pressure and purging timing for a cleaning of a sample probe.

12. The method as claimed in claim 1, wherein controlling the sample handling system to perform the one or more automated corrective actions comprises:

providing instructions to the sample handling system to retract a sample probe and clean the sample probe with a pneumatically activated cleaning system.

13. The method as claimed in claim 1, wherein controlling the sample handling system to perform the one or more automated corrective actions comprises:

providing instructions to the sample handling system to recalibrate the gas analyzer and purge the sample line.

14. The method as claimed in claim 1, wherein controlling the sample handling system to perform the one or more automated corrective actions comprises:

providing instructions to the sample handling system for adjustment of a needle valve to maintain a flow rate at the gas analyzer.

15. The method as claimed in claim 1, wherein the plurality of time series data is date and time stamped and further tagged with instrument ID and firmware versions.

16. The method as claimed in claim 15, wherein a respective generated distribution of the generated distributions is generated for each operational state of the sample handling device, the operational states comprising a normal state, a degradation state, and a failure state, and wherein determining the at least one operating condition of the sample handling system further comprises:

determining, by the one or more processors of the condition monitoring system, that the at least one operation condition comprises at least one of the normal state, the degradation state, or the failure state based on a comparison of the operational parameter trend to a reference value rate of change for each respective generated distribution.

17. The method as claimed in claim 16, wherein the at least one operating condition comprises one of the operational states and a prediction of a defined time after the current state where the operating condition changes to a next state of the operational states, the prediction based on the rate of change of the at least one measured operational parameter.

* * * * *